United States Patent [19]
Dutka et al.

[11] Patent Number: 5,852,943
[45] Date of Patent: Dec. 29, 1998

[54] DOOR LOCK MECHANISM FOR AN AUTOMOTIVE VEHICLE

[75] Inventors: Harry F. Dutka, Taylor; Ronald L. Merckling, Macomb Township, both of Mich.

[73] Assignee: UT Automotive Dearborn, Inc., Dearborn, Mich.

[21] Appl. No.: 642,765

[22] Filed: May 6, 1996

[51] Int. Cl.[6] .................................................. E05B 65/12
[52] U.S. Cl. ................. 70/237; 70/208; 70/257; 70/264; 70/277; 292/201; 292/DIG. 25; 292/DIG. 43
[58] Field of Search ...................... 292/144, 201, 292/DIG. 29, DIG. 43, DIG. 25, DIG. 21, DIG. 42, DIG. 3; 70/257, 208, 277, 264, DIG. 30, 237

[56] References Cited

U.S. PATENT DOCUMENTS

| | | | |
|---|---|---|---|
| 3,659,308 | 5/1972 | Gute | 15/250.02 |
| 3,688,322 | 9/1972 | Bellware . | |
| 3,924,427 | 12/1975 | San Juaquin | 292/144 |
| 4,263,821 | 4/1981 | Savage et al. | 74/595 |
| 4,310,943 | 1/1982 | Palma | 15/250.01 |
| 4,573,723 | 3/1986 | Morita et al. . | |
| 4,653,689 | 3/1987 | Sakurai et al. . | |
| 4,674,781 | 6/1987 | Reece et al. . | |
| 4,702,117 | 10/1987 | Tsutsumi et al. . | |
| 4,867,495 | 9/1989 | Nakamura | 292/DIG. 62 |
| 5,154,457 | 10/1992 | Watanabe | 292/DIG. 62 |
| 5,222,775 | 6/1993 | Kato . | |
| 5,224,364 | 7/1993 | Claar et el. . | |
| 5,238,274 | 8/1993 | Becker et al. . | |
| 5,241,787 | 9/1993 | Norman . | |
| 5,265,454 | 11/1993 | Crocco et al. . | |
| 5,295,374 | 3/1994 | Bender et al. | 292/DIG. 43 |
| 5,382,763 | 1/1995 | Martus et al. . | |
| 5,438,855 | 8/1995 | Ikeda . | |
| 5,454,608 | 10/1995 | Dzurko et al. | 292/216 |
| 5,694,812 | 12/1997 | Maue et al. . | |

FOREIGN PATENT DOCUMENTS

| | | |
|---|---|---|
| 0 267 423 | 5/1988 | European Pat. Off. . |
| 38 07 087 A1 | 9/1989 | Germany . |
| 5-86761 | 4/1993 | Japan . |
| WO 96/33891 | 10/1996 | WIPO . |
| WO 96/33892 | 10/1996 | WIPO . |
| WO 96/33893 | 10/1996 | WIPO . |

OTHER PUBLICATIONS

1973 Car Shop Manual, vol. IV Body, Sep., 1972, pp. 44–06–09 thru 44–06–15, 44–16–01 thru 44–16–03, 44–41–09 thru 44–41–13, 44–61–01 thru 44–61–02, 44–76–01 thru 44–76–07.

4 photographs of a door lock mechanism, prior to May 6, 1996.

Saab 900, 1979 thru 1985, Owners Workshop Manual, 1986, Chapter 12 pp. 234–240.

*Primary Examiner*—Steven Meyers
*Assistant Examiner*—Tuyet-Phuong Pham
*Attorney, Agent, or Firm*—Harness, Dickey & Pierce, P.L.C.

[57] ABSTRACT

A rotatable cam of the present invention has an internal edge completely surrounding an elongated slot, a portion of which serves as a camming surface for interfacing with a cam follower. A further aspect of the present invention employs a door lock control member linearly slidable from a locked position to an unlocked position while also being pivotable between a nominal latching position and an unlatching position. In yet another aspect of the present invention, one end of the door lock control member is coupled to a liftgate door latch and the other end is coupled to a multi-functional electric motor by way of a drive transmission and a cable. In still a further aspect of the present invention, a window wiper assembly is drivably coupled to the drive transmission. A method of unlatching an automotive vehicle door is also provided.

9 Claims, 5 Drawing Sheets

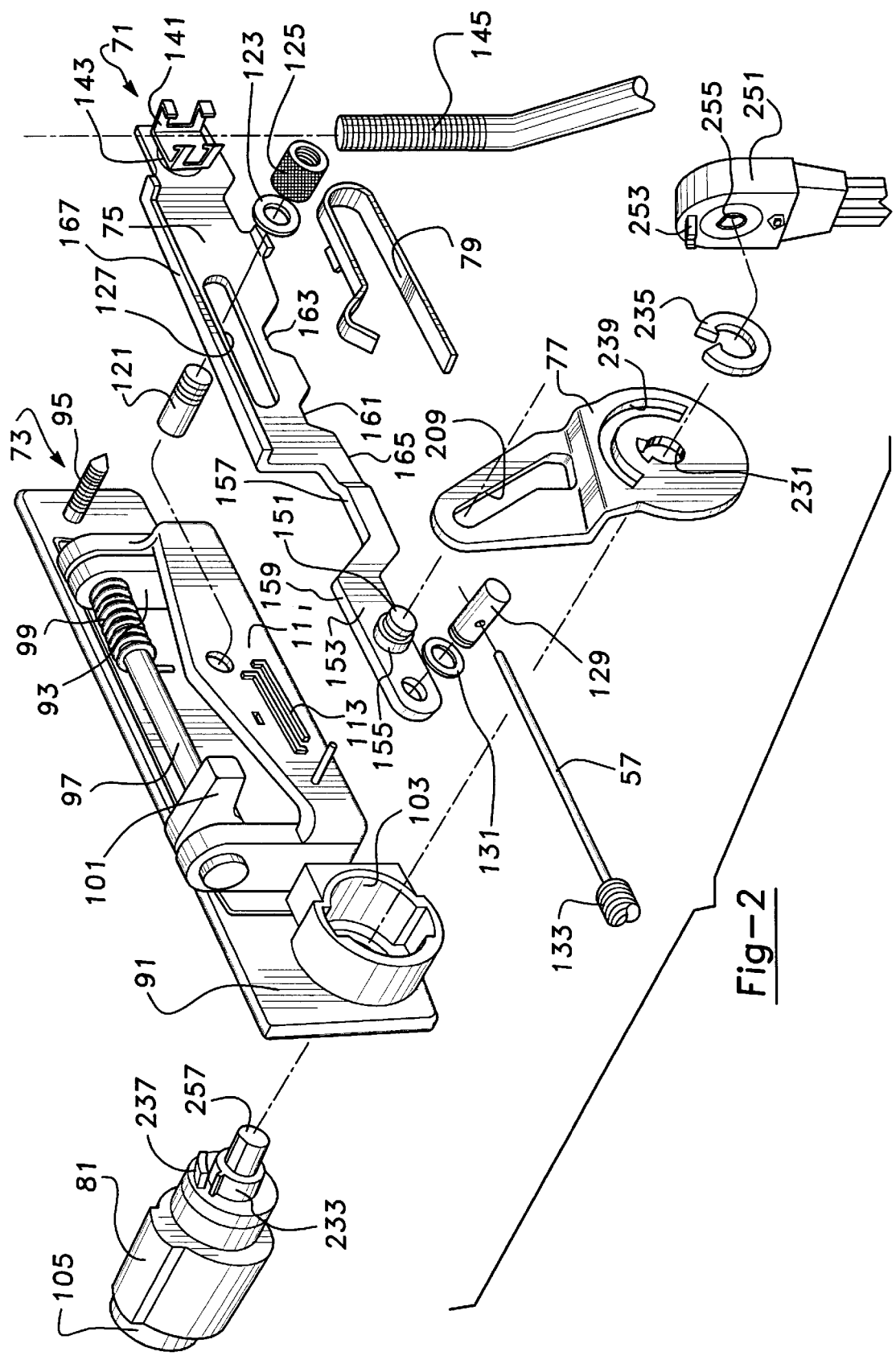

DOOR LOCK MECHANISM FOR AN AUTOMOTIVE VEHICLE

BACKGROUND OF THE INVENTION

This invention relates generally to door lock mechanisms for automotive vehicles and more specifically, to a rotatable member providing a lost motion linkage function during normal handle unlatching and also providing a camming function to unlatch a door latch mechanism when a door lock control member is in a locked position.

It has become commonplace to employ powered door lock systems within most automotive vehicles. Such powered door lock mechanisms are typically provided within each passenger door and also a liftgate or cargo door of vans or the like. Most conventional powered door lock systems use a solenoid or fractional horsepower dc electric motor for moving a lock rod or lever coupled to the door latch in response to occupant actuation of an interior or remotely activated electrical switch. In many cases, these lock rods or levers can also be moved by manual rotation of a vehicle entry key inserted within a key lock cylinder in the door.

However, conventional vehicle door lock systems have proven problematic in the event that the solenoid or electric motor fails to properly move the lock rod or lever when the occupant desires to unlock the vehicle door. Failure of the automatic door unlock actuation could result from a run-down electrical battery, a blown fuse, electric motor or solenoid malfunctions, or wire harness connector interruptions. Accordingly, the solenoid or electric motor must be overridden through manual rotation of the key and key lock cylinder tumbler past the normal key cylinder unlock position; in effect, this manual overriding action manually backdrives the solenoid or electric motor and mechanically forces lock rod or lever movement for subsequent door unlatching. Some of these traditional systems employ a lost motion linkage to allow for this manual overriding. Examples of such systems are disclosed within the following U.S. Pat. Nos.: 5,454,608 entitled "Vehicle Door Latch" which issued to Dzurko et al. on Oct. 3, 1995; 5,438,855 entitled "Vehicle Door Lock Device with Super Lock Mechanism" which issued to Ikeda on Aug. 8, 1995; and U.S. Pat. No. 5,238,274 entitled "Device for Locking and Unlocking Closed Doors to the Interior of a Motor Vehicle" which issued to Becker et al. on Aug. 24, 1993.

Another conventional door lock system employs a linearly slidable door lock control slide bar having a first end coupled to a conventional reversible electric motor by way of a C-shaped plastic jaw extending from a motor driven rod. An opposite end of the slide bar is coupled to a vertically movable lock rod which, in turn, latches and unlatches a liftgate latching mechanism. A single-plane lost motion linkage hook is rotatably mounted upon a key cylinder. The hook has an externally accessible slot for receiving a generally cylindrical post extending from a face of the slide bar. An elongated portion of the slot is vertically oriented and acts to manually backdrive the electric motor by linearly sliding the latch control slide bar from a locked position to an unlocked position in the event of a system failure.

Notwithstanding, these traditional manually overriding devices are ineffective for backdriving and overriding more recently developed electric motors which employ complex drive transmissions, such as geneva gears, starwheels and other intermittent motion devices coupled to a worm gear. In excess of 25 pound-inches of force would be required to manually rotate the key to an override unlocking position in the conventional linearly slidable control slide bar system. Such relatively high forces could damage the key, key cylinder, linkages and power transmission components. Accordingly, it would be desirable to provide a manually overriding mechanism which does not require backdriving of an electromagnetic device in order to unlock and unlatch an automotive vehicle door lock mechanism in the event of automatic actuation failure.

SUMMARY OF THE INVENTION

In accordance with the present invention, a preferred embodiment of a door lock mechanism for an automotive vehicle employs a manually rotatable cam coupled to a door lock control member for providing a lost motion linkage function during handle unlatching and also providing a camming function to the control member to unlatch the door latch mechanism when the control member is maintained in a locked position. In another aspect of the present invention, the rotatable cam has an internal edge completely surrounding an elongated slot, a portion of which serves as a camming surface for interfacing with a cam follower. A further aspect of the present invention employs a door lock control member linearly slidable from a locked position to an unlocked position while also being pivotable between a nominal latching position and an unlatching position. In yet another aspect of the present invention, one end of the door lock control member is coupled to a liftgate door latch and the other end is coupled to a multi-functional electric motor by way of a drive transmission and a cable. In still a further aspect of the present invention, a window wiper assembly is drivably coupled to the drive transmission. A method of unlatching an automotive vehicle door is also provided.

The door lock mechanism of the present invention is advantageous over conventional systems in that the present invention does not significantly backdrive an electromagnetic actuator when a control member is manually overridden and slid from a locked position to an unlocked position. The present invention is also advantageous by employing fewer linkage parts as compared to most traditional overriding devices. Another advantage of the present invention is that minimal effort (approximately 12.5 pound-inches) is needed to rotate the key and key lock cylinder tumbler due to the camming action performed along the mechanically advantageous, inclined camming surface angle provided. The totally closed camming slot, having an enlarged segment, of the present invention rotatable cam also serves to ease and quicken assembly of the cam follower while also providing additional part strength and dimensional stability. Additional advantages and features of the present invention will become apparent from the following description and appended claims, taken in conjunction with the accompanying drawings.

BRIEF DESCRIPTION OF THE DRAWINGS

FIG. 2 is an exploded perspective view showing the preferred embodiment of the present invention door lock mechanism;

DETAILED DESCRIPTION OF THE PREFERRED EMBODIMENT

Figure 1:
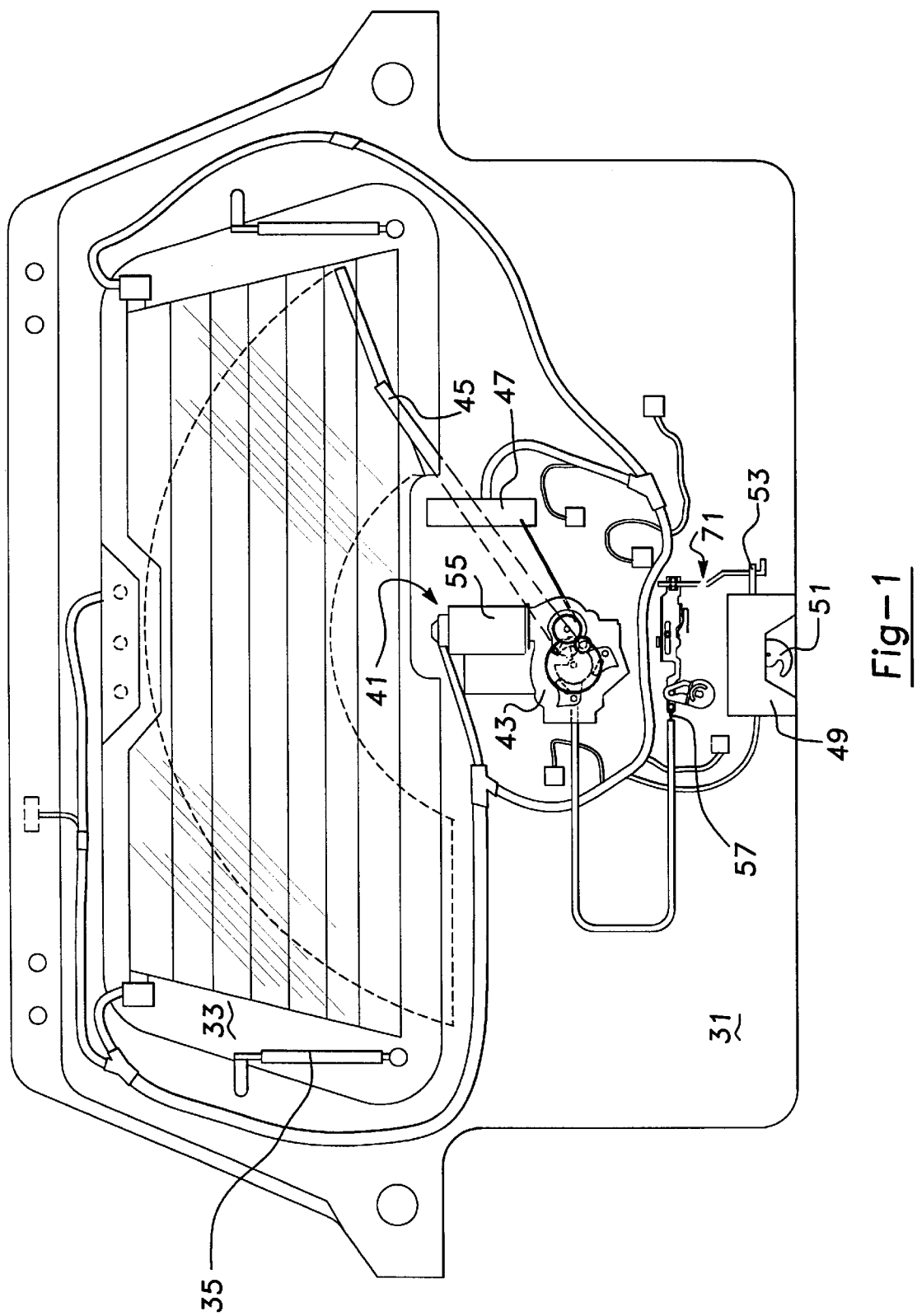
FIG. 1 is a diagrammatic front elevational view showing an automotive vehicle liftgate door employing the preferred embodiment of a door lock mechanism of the present invention.

An automotive vehicle, such as a minivan or the like, has a rear liftgate door which can pivot about an upper pair of hinges coupled to the vehicle body structure. When the liftgate is pivoted to an open position, a cargo space is accessible from behind the vehicle. Such a liftgate is shown in FIG. 1. Liftgate 31 has a rear window or backlite 33 pivotable between a closed position, substantially flush with the outer surface of liftgate 31, to an open position about the upper hinges. A pair of pneumatic cylinders 35 act to push window 33 toward the open position when a lower portion of window 33 is released.

A multi-functional apparatus 41 is mounted upon an inner surface of liftgate 31. The majority of apparatus 41 is hidden by an interior trim panel (not shown). Apparatus 41 includes a central drive and power transmission 43, a window wiper assembly 45, a window release latch 47 and a liftgate latch mechanism 49, all of which are mounted upon liftgate 31. An exemplary liftgate door latch is disclosed in U.S. Pat. No. 5,382,763 entitled "Electrical Switch for Automotive Vehicle Deck Lid Latches" which issued to Martus et al. on Jan. 17, 1995, the mechanical aspects of which are incorporated by reference herewithin. The door latch employed with the present invention utilizes a spring biased hook 51 movable in response to raising and lowering of a transversely disposed lever 53. The window wiper assembly includes a metallic wiper arm and a rubber window wiper blade.

Apparatus 41 further includes a fractional horsepower, dc electric motor 55 with a rotatable armature and armature shaft which drive a worm gear. The power transmission is of the type disclosed in U.S. Patent Application entitled "Multi-Functional Apparatus Employing an Intermittent Motion Mechanism", U.S. Ser. No. 08/430,388, filed on Apr. 28, 1995, which is incorporated by reference herewithin. This power transmission 43 has a helical gear and drum which drive three intermittent rotary motion cams or geneva gears. A first of these intermittent rotary motion cams selectively causes movement of wiper assembly 45. A second of these intermittent rotary motion cams operates window latch 47. Furthermore, the third of the intermittent rotary motion cams pushes and pulls a cable 57, by way of a shaft and a lever crimped onto cable 57, for operating the preferred embodiment of a door lock mechanism 71 of the present invention.

Figure 11:
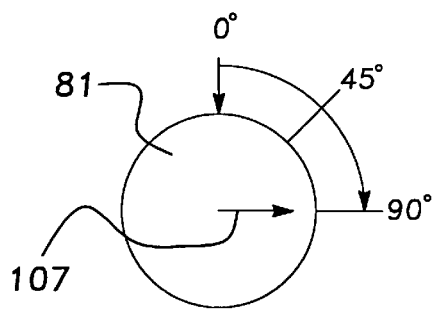
Figure 3:
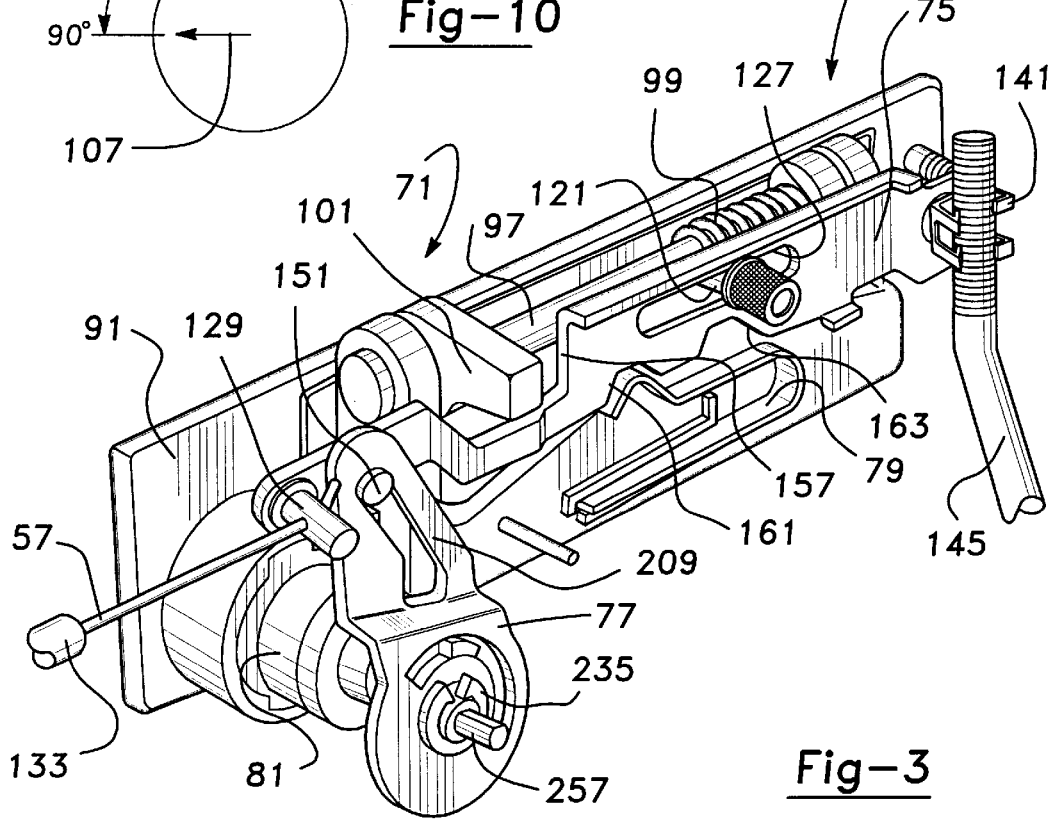
FIG. 3 is an assembled perspective view showing the preferred embodiment of the present invention door lock mechanism.

As can best be observed in FIGS. 2 and 3, the preferred embodiment of the present invention door lock mechanism 71 includes a handle assembly 73, a linearly slidable door lock control member or link 75, a rotatable cam 77, a detent tensioning spring 79 and a key lock cylinder 81. Handle assembly 73 has an aesthetically pleasing, injection molded polymeric bezel 91, a driver accessible handle 93 (see also FIG. 9), a metallic threaded mounting post 95, a metallic pivot pin 97 and a helically coiled biasing spring 99. A handle protrusion 101 is integrally injection molded with handle 93 and is hidden within the liftgate door. Spring 99 acts to normally bias handle 93 to a latched position generally flush with the appearance side of bezel 91. Handle 93 is manually activated to pivot about pivot pin 97. Key lock cylinder 81 is received within a key lock cylinder sleeve 103 integrally molded with bezel 91. Thus, a tumbler section 105 of key lock cylinder 81 is exposed to the exterior of the automotive vehicle for insertion of a manually rotatable key, diagrammatically shown as reference number 107 in FIGS. 9–11. Returning again to FIGS. 2 and 3, detent spring 79 is affixed to the forward facing and hidden surface 111 of bezel 91 and is received within mating ribs 113 and an adjacent slot. Detent spring 79 is preferably injection molded from a nylon polymeric material.

Door lock control member 75 is slidably attached to surface 111 of handle bezel 91 via a pivot post 121, washer 123 and nut 125. Post 121 may either be integrally formed as part of bezel 91, or may be separately crimped or otherwise secured to bezel 91 such that post 121 can be metallic. Pivot post 121 is slidably received within a linearly elongated slot 127 defined by an interior edge. Lubricant is also applied.

A partially threaded cable securing pedestal 129 and retention washer 131 serve to secure a distal end of flexible metal cable 57 to an end of door lock control member 75. A directly applied crimp or other cable securing means can alternately be employed. Bendable, yet longitudinally rigid, cable 57 freely slides within a somewhat flexible metal sheath 133. The opposite end of door lock control member 75 has a stamped metallic claw 141 and polymeric spacer 143 secured thereon. A threaded end of a generally cylindrical and elongated lock rod 145 is mounted within claw 141. The lower end of lock rod 145 is coupled to lever 53 (see FIG. 1) of door latch mechanism 49 (also see FIG. 1).

A metal cam follower 151, having an external cylindrical surface, extends from a face 153 of door lock control member 75. A standoff 155 also partially surrounds cam follower 151 immediately adjacent to face 153. Door lock control member 75 further has a clearance notch 157 disposed in an upper peripheral edge 159. A pair of detent notches 161 and 163 are additionally disposed within a lower peripheral edge 165 of door lock control member 75. Detent notch 161 corresponds to a locked position of door lock control member 75 while detent notch 163 corresponds to an unlocked position of door lock control member 75. Door lock control member 75 additionally has a turned upper edge segment 167 to add stiffness to the part. Door lock control member 75 is preferably stamped from low carbon 1040 grade steel.

Figure 4:
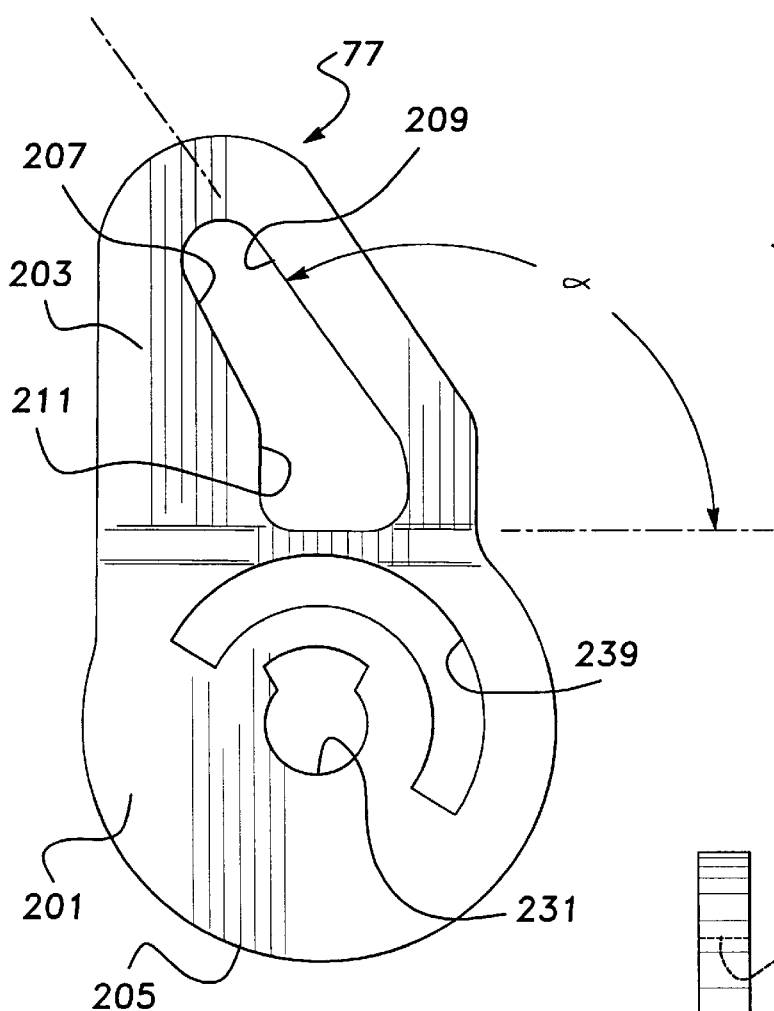
FIG. 4 is a front elevational view showing the preferred embodiment of a rotatable cam employed in the present invention door lock mechanism.
Figure 5:
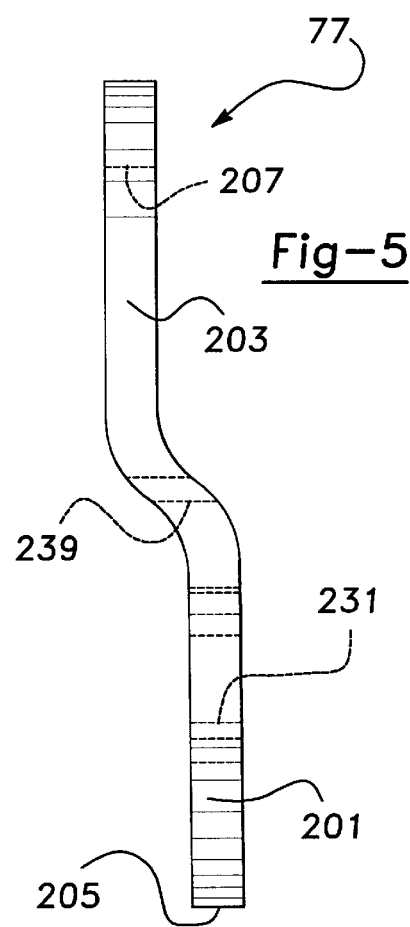
FIG. 5 is a side elevational view showing the preferred embodiment of a rotatable cam employed in the present invention door lock mechanism.

With reference to FIGS. 4 and 5, rotatable cam 77 has a body 201 and a peripherally depending tab 203. A plane of tab 203 is offset but parallel to a plane of body 201 to maximize packaging space. A portion of peripheral edge 205 corresponding with body 201 has a generally circular shape while the portion of peripheral edge 205 surrounding tab 203 has a somewhat triangular shape with a rounded tip. A first internal edge 207 defines an elongated slot within tab 203. A camming surface segment 209 of internal edge 207 is preferably straight and is provided with an angle α of 125 degrees as measured from the nominal horizontal sliding axis of door lock control member 75 (see FIG. 3). A lower segment 211 of internal edge 207 is transversely enlarged beyond the corresponding transverse dimension of cam follower 151 (see FIG. 2); this provides for easy installation and insertion of cam follower 151 (see FIG. 2) within the slot of rotatable cam 77. Significantly, internal edge 207 completely surrounds the elongated slot and forms a continuously closed shape. Rotatable cam 77 is preferably stamped from low carbon, cold rolled steel, grade 1018.

Referring now to FIGS. 2–4, body 201 of rotatable cam 77 further has a second internal edge 231 defining a centrally positioned, key-holed aperture for mating in registry with a corresponding retainable protrusion 233 projecting from key lock cylinder 81. A stamped metal snap ring 235 is then secured upon protrusion 233 on the outside of rotatable cam 77. An arcuate flange 237 also depends from key lock cylinder 81 and extends through a semi-circular through-channel defined by a third internal edge 239 within body 201. A rotary switch 251 has an upper forcated structure 253 secured to flange 237 of key lock cylinder 81 and has a central hollow key holed cavity 255 mating in registry with rotating pin 257 of key lock cylinder 81. Switch 251 provides a security signal regarding the locking and unlocking states of the key lock cylinder 81. An exemplary rotary switch is disclosed within U.S. Pat. No. 5,224,364 entitled "Device for Sensing Rotary Angles of a Lock Cylinder in a Key-Actuated Lock System" which issued to Claar et al. on Jul. 16, 1993, and is incorporated by reference herewithin.

Figure 9:
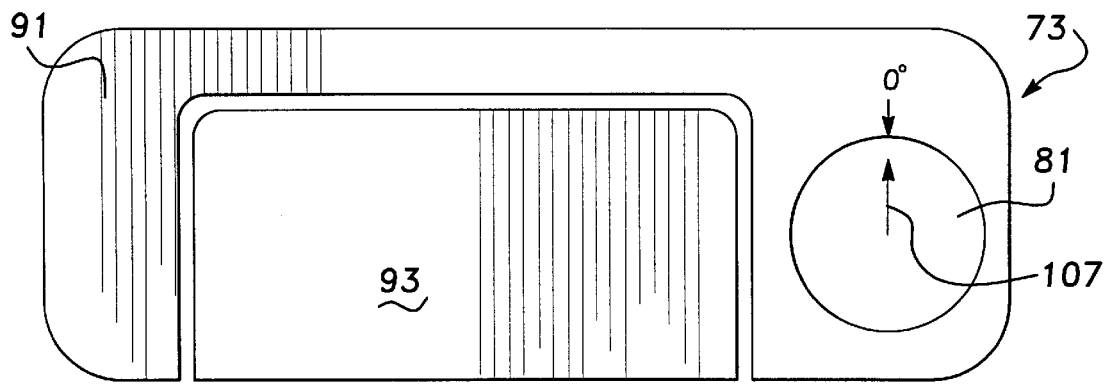
FIGS. 9–11 are diagrammatic rear elevational views showing the key positions employed with the preferred embodiment of the present invention door lock mechanism.
Figure 10:
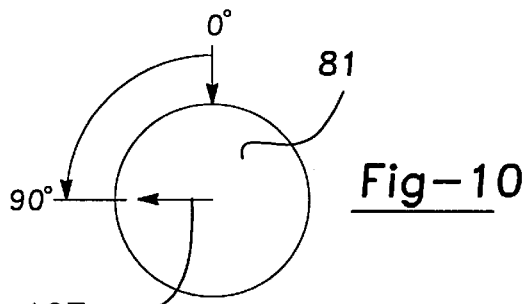

The operation and function of the door lock mechanism of the present invention will now be discussed. FIG. 9 shows the normal key insertion position in relation to the key lock cylinder 81. FIG. 10 shows key 107 turned 90 degrees counterclockwise (as viewed from behind the vehicle liftgate) to a manual lock position corresponding to FIG. 7, as will be further discussed hereinafter. Finally, FIG. 11 also illustrates key 107 rotated 90 degrees clockwise to a manually overriding unlock and unlatch position corresponding to FIG. 8, as will also be further discussed hereinafter, in the event of an electrical system failure. With this preferred embodiment, the traditional 45 degree clockwise rotation of key 107, for manual door unlocking, will not fully unlock the present invention door lock mechanism.

Figure 6:
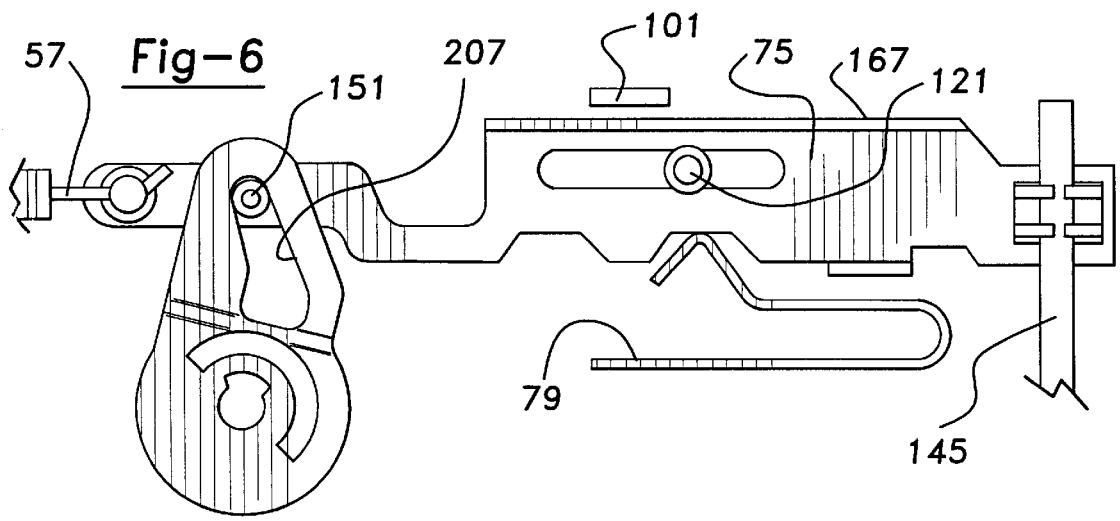
FIGS. 6–8 are diagrammatic front elevational views showing various operating positions of the preferred embodiment of the present invention door lock mechanism.

As can be observed in FIG. 6, door lock control member 75 is positioned in an unlocked and latching position. In this scenario, handle protrusion 101 can fully abut against turned edge segment 167 for pivoting door lock control member 75 about pivot post 121. Accordingly, door lock control member 75 raises door lock linkage 145 for unlatching door latch 49 (see FIG. 1). Concurrently, cam follower 151 freely slides within the elongated slot defined by internal edge 207 in a lost motion manner. Tensioning detent spring 79 is also compressed during this pivoting movement. Handle protrusion 101 is caused to abut against and pivot door lock control member 75 in response to a person pulling up on handle 93 (see FIG. 9).

Figure 7:
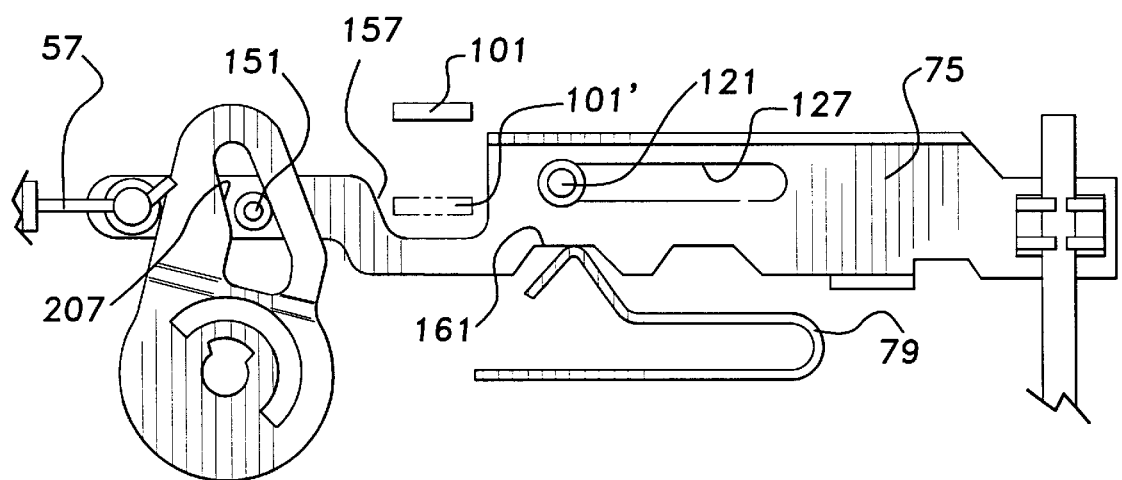

Appropriate energization of electric motor 55 (see FIG. 1) pushes cable 57 which slides door lock control member 75 to a locked and latching position as is shown in FIG. 7. In this locked position, handle protrusion 101 can freely move to position 101' within clearance notch 157 without sufficiently abutting against and pivoting door lock control member 75 to cause unlatching. Furthermore, tensioning spring 79 engages detent notch 161. Also, pivot post 121 has been linearly slid along slot 127 and cam follower 151 has moved along the slot defined by internal edge 207 in a lost motion manner.

Figure 8:
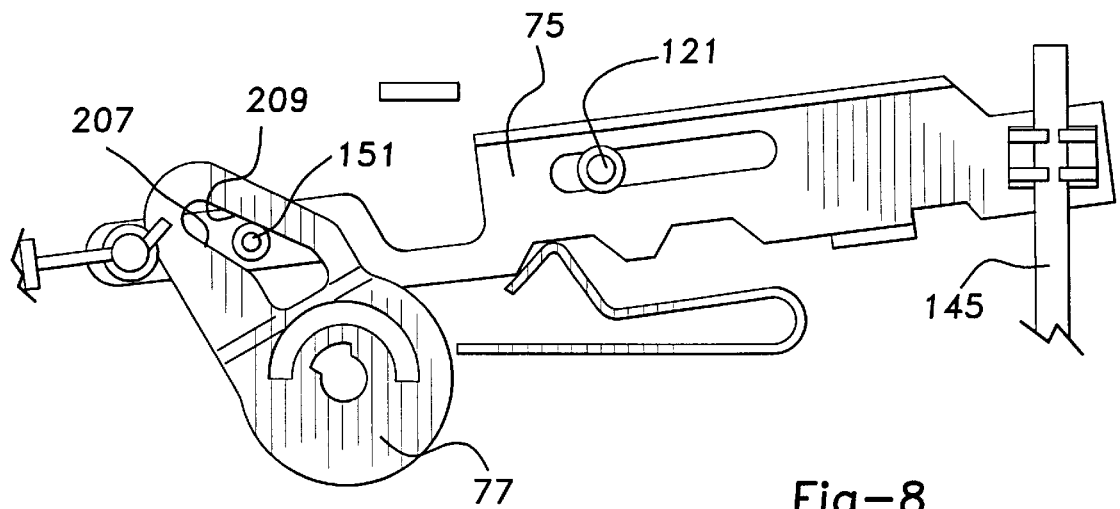

FIG. 8 demonstrates the manually overridden unlatching situation where door lock control member 75 is maintained in a locked state but where manual key and key cylinder tumbler rotation simultaneously rotates rotatable cam 77. This causes cam follower 151 to ride along camming surface 209 of internal edge 207. Concurrently, door lock control member 75 is pivoted about pivot post 121 such that door lock linkage 145 is raised to unlatch door lock mechanism 49 (see FIG. 1).

While the preferred embodiment of this door lock mechanism has been disclosed, it will be appreciated that various modifications may be made without departing from the present invention. For example, a camming surface can be disposed on a door lock control member while a cam follower is disposed on a rotatable plate coupled to a key lock cylinder. In another alternate approach, a door lock control member may have a multitude of differing shapes as long as it linearly slides between locked and unlocked positions as well as pivoting between latching and unlatching positions. In another alternate configuration of the present invention, a camming surface of a rotatable cam may have an arcuate or other angled shape as long as it will apply sufficient mechanical advantage to pivot a door lock control member. Other door lock and electromagnetic device linkages may be employed. Moreover, alternate electric motor or solenoid drive transmissions and gearing combinations may be utilized in combination with a door lock mechanism of the present invention. Various materials have been disclosed in an exemplary fashion, however, other materials may of course be employed. It is intended by the following claims to cover these and any other departures from the disclosed embodiments which fall within the true spirit of this invention.

The invention claimed is:

1. An apparatus for use in an automotive vehicle, said apparatus comprising:

a door lock control member linearly movable between a locked position and an unlocked position, said door lock control member further pivotable between a nominal latching position and an unlatching position;

a cam follower projecting from said control member;

a body rotatable about a pivot point; and a tab extending from said body, said tab further being offset from said body;

means for pivoting said control member from said nominal latching position to said unlatching position when said body is manually rotated, said pivoting means pivoting said control member even when said control member is disposed in said locked position a camming surface of said tab operably moving said cam follower and said control member, said camming surface being substantially perpendicular to a linear axis along which said control member slides between said locked and unlocked positions; and a continuously closed internal edge defining and completely surrounding an elongated slot being disposed within said tab and including said camming surface.

2. The apparatus of claim 1 wherein said camming surface has an inclined angle of substantially 125 degrees as measured from said linear axis along which said control member slides between said locked and unlocked positions.

3. The apparatus of claim 1 further comprising:

a pivot post being engagably received within a linearly elongated slot of said control member;

a mechanical lock connector being coupled to a first end of said control member;

a mechanical actuator connector being coupled to a second end of said control member; and said linearly elongated slot and said cam follower of said control member being substantially positioned between said first and second ends of said control member.

4. The apparatus of claim 3 further compromising:

a pair of detent notches being depressed in an external edge of said control member;

an operator accessible handle having a hidden handle protrusion moving in concert with operation of said handle, said handle protrusion abutting against a portion of said control member and pivoting said control member to said unlatching position when said control member is disposed in its unlocked position; and a clearance notch in said control member substantially preventing said handle protrusion from abutting and pivoting said control member when said control member is disposed in its locked position.

5. The apparatus of claim 1 further comprising a key lock cylinder having a rotatable section engaging with and operably rotating said body about said pivot point radially offset from said camming surface.

6. The apparatus of claim 1 further comprising:

an electric motor having a drive transmission;

a window wiper arm coupled to said drive transmission; and a cable coupling said control member to said drive transmission.

7. An apparatus for use in an automotive vehicle, said apparatus comprising:

a door latch mechanism disposed in an automotive vehicle liftgate;

a single electric motor having a drive transmission;

a window wiper assembly coupled to said drive transmission;

an operator accessible handle;

a lock linkage movable between latching and unlatching positions in response to actuation of said handle and movable between locked and unlocked positions in response to actuation of said single electric motor;

a cam follower being coupled to said lock linkage;

a rotatable cam having an enclosed elongated slot, said elongated slot having an inclined camming surface and an enlarged portion adapted to operably engage said cam follower of said lock linkage so as to define a lost motion linkage, said lost motion linkage providing a lost motion function during automatic handle unlatching and providing a manual camming function to said lock linkage for unlatching said door latch mechanism while said lock linkage is maintained in said locked position; and a cable coupling said lock linkage to said drive transmission of said electric motor, wherein said single electric motor is coupled to both said window wiper and said lock linkage.

8. The apparatus of claim 7 wherein said rotatable cam includes a body offset from a depending tab, said tab having a continuously closed internal edge defining an internal slot for camming said lock linkage.

9. The apparatus of claim 8, wherein said continuously closed internal edge is substantially vertical.

* * * * *